INVENTORS
BYRON K. POOL
PAUL E. LOWE

BY *Melville, Strasser, Foster and Hoffman*
ATTORNEYS

United States Patent Office 3,738,898
Patented June 12, 1973

3,738,898
APPARATUS FOR BONDING MATERIALS WITH HEAT SETTABLE ADHESIVE
Paul E. Lowe and Byron K. Pool, Cincinnati, Ohio, assignors to Natmar, Inc., Cincinnati, Ohio
Filed Feb. 4, 1971, Ser. No. 112,604
Int. Cl. B32b *31/00;* B30b *15/34*
U.S. Cl. 156—498                                          9 Claims

ABSTRACT OF THE DISCLOSURE

Machine having a platen and a pressure clamping head arranged to clamp the materials to be bonded against the platen under pressure, and means for successively heating and thereafter cooling the clamped materials so as to effect a complete bonding prior to release of the materials.

BACKGROUND OF THE INVENTION

This invention relates to a machine or apparatus for bonding two or more materials together with a heat settable adhesive, and more particularly to a machine for applying cloth emblems or the like having a previously applied heat settable adhesive to a garment.

The use of embroidered or other cloth emblems and insignia on a variety of garments is becoming more and more widespread. Such emblems are utilized by both the military services and civilian establishments for identification purposes, as well as to personalize garments or the like.

Generally speaking, according to the prior art, the embroidered emblem is simply sewn onto the garment by hand or machine. Regardless of whether the sewing operation is carried out by hand or by machine, it is a very time consuming operation, and the art has long sought an equally satisfactory method of attachment which can be carried out far more quickly and by unskilled personnel.

Various adhesives have been developed which will satisfactorily secure together two or more cloth pieces, but the handling of such adhesive alone often proves difficult.

The art has now developed a heat settable adhesive which can be applied to emblems or the like and dried to a completely non-tacky, stable state. Thus, the embroidered labels with the previously applied adhesive can be produced, handled, and shipped without problem under all normal temperature conditions.

It should be emphasized at the outset that the adhesive used does not, per se, form a part of this invention. It is an object of this invention to provide a machine and apparatus which will fully and completely bond emblems or other insignia having a previously applied heat settable adhesive layer to a garment.

It is a further object of this invention to provide such a machine which is very rapid in operation, so that the labor time involved per unit is as short as possible.

It is a further object of the invention to provide a machine as described above which is fully automatic in operation so that it can be operated by unskilled personnel and without extensive training. The automatic operation of the machine will enable the operator to carry out part of the necessary operation, such as the selection of emblems, unpacking of garments to which the labels are to be applied, or packing the finished garment while the machine is in operation.

Still a further object of the invention, and indeed an important one, is to provide a machine which, by its cycle of operation, will insure a complete and thorough bonding of the emblem to the garment.

These and other objects of the invention will become apparent to the skilled worker in the art upon a careful consideration of the following detailed description of the invention.

SUMMARY OF THE INVENTION

In its broadest aspects, this invention contemplates a machine having a platen adapted to receive the juxtaposed materials to be bonded. Generally speaking, the platen will be horizontally oriented, so that the materials to be bonded can simply rest thereon. A pressure clamping head is provided which is movable to a position clamping under substantial pressure the materials against the platen. Once the materials are clamped in place, heat sufficient to effect bonding will be applied to the materials via the platen, and while the materials are clamped against the platen, the heat is removed and the platen is cooled. This will effect a complete bonding of the emblem to the garment prior to the removal of the clamping pressure.

DESCRIPTION OF THE PREFERRED EMBODIMENT

Figure 1:
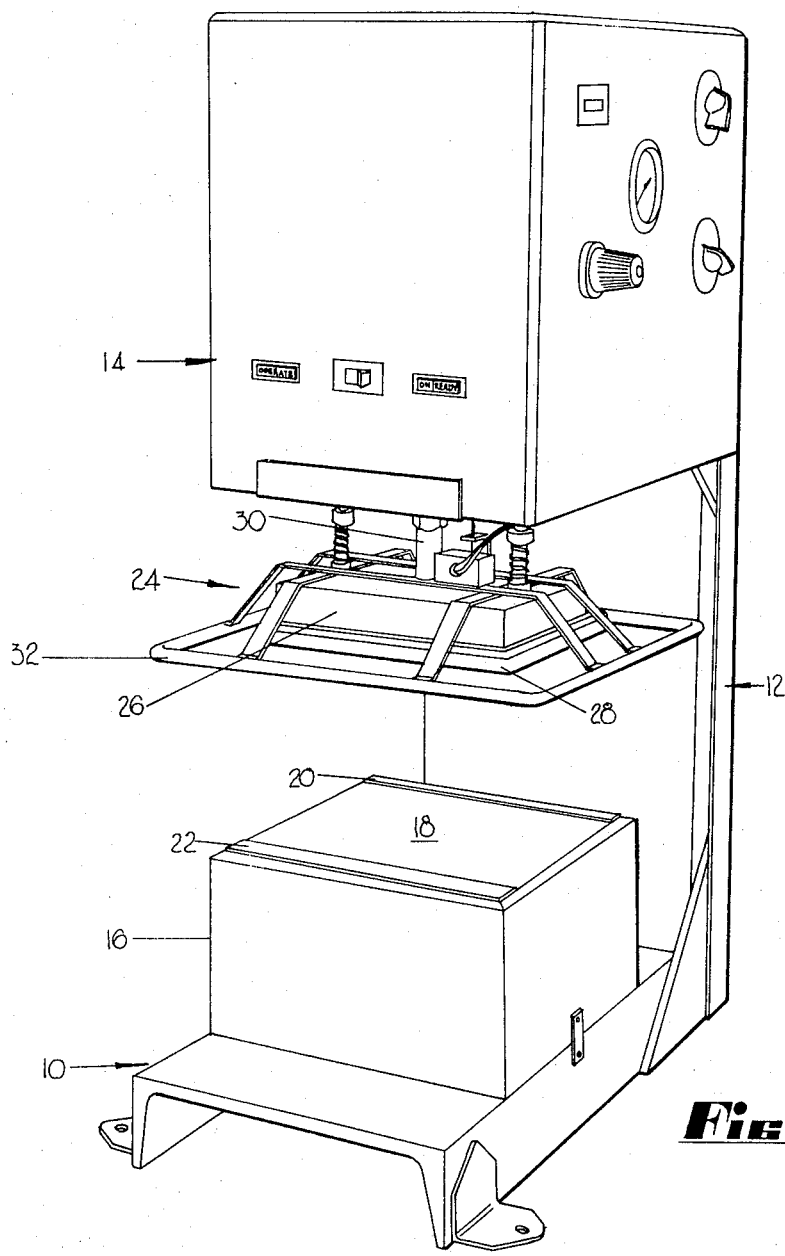
FIG. 1 is a perspective view of one embodiment of the machine according to this invention.

It is believed that a full understanding of the invention will be facilitated by a general description of operation with reference to FIG. 1. The machine includes a base indicated generally at 10, a vertical back 12, and an upper cabinet 14. In FIG. 1, the base 10 is shown as carrying the rectangular, sheet metal housing 16. As will be explained hereinafter, the heating element shown in FIG. 4 and the cooling means are disposed in the cabinet 16. At the top of the cabinet 16 is the platen surface 18. The Teflon surface should be a high heat conducting, low heat retaining material. In other words, it should be a material which will both heat up and cool down very quickly. Satisfactory results have been obtained utilizing a black anodized aluminum sheet covered with a Teflon material. Equally satisfactory results have been obtained utilizing simply a Teflon, glass filled fabric held in place by the edge clamps 20 and 22.

In operation, the garment to which the emblem is to be applied is placed in the proper position on the platen surface 18. The emblem with the previously applied adhesive layer is placed in the proper position upon the garment, and a suitable switch is actuated by the operator.

Actuation of the switch causes the pressure clamping head indicated generally at 24 to move downwardly to a position clamping the material to be bonded against the platen surface 18.

The clamping head shown includes the heavy steel block 26 having its lowermost face covered with a thick, silicone rubber pad. The clamping head, in the embodiment shown, is moved downwardly by the piston 30 of an hydraulic cylinder sized to exert a pressure on the order of 30 p.s.i. against the platen surface 18.

The rectangular ring 32 surrounding the clamping head 34 is simply a safety device. That is, deflection of the ring 32 by the hand or clothing of an operator will actuate a suitable switch to be described hereinafter, immediately causing the clamping head 24 to retract to the uppermost position.

Once the materials to be bonded are tightly clamped against the platen surface 18, heat is supplied to the platen for a predetermined time interval. The quantity of heat supplied will of course depend upon the precise adhesive being used. With the heat settable adhesives of the time generally under consideration herein, temperatures on the order of 450° F. are satisfactory. After the completion of the predetermined heating time interval, the platen and material to be bonded are then subjected to a cooling cycle of another predetermined time interval.

At the conclusion of the cooling cycle, the clamping head 24 is moved upwardly to the initial position, and the garment with the attached emblem may be removed for packing and shipment or the like.

Figure 4:
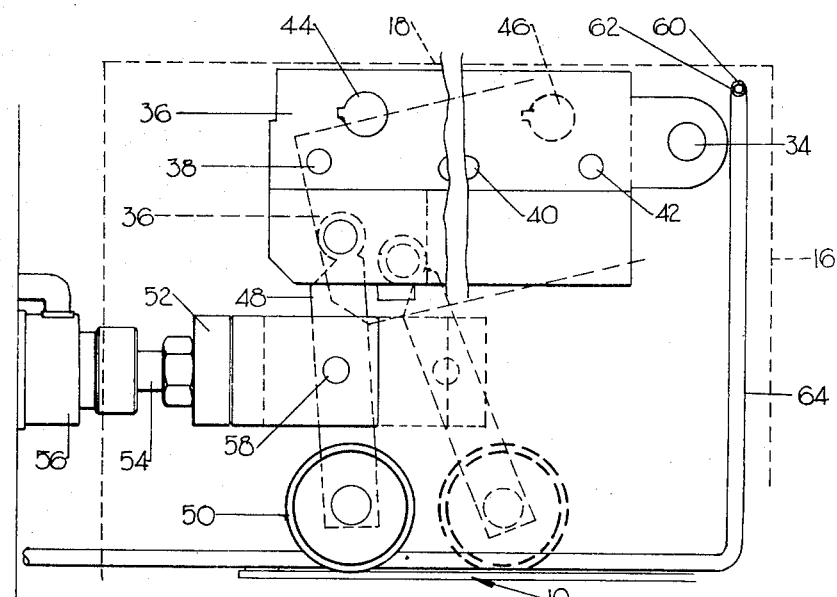
FIG. 4 is a side elevational view showing one embodiment of the structure for heating the materials to be bonded.

Referring now briefly to FIG. 4, one emzodiment of structure for accomplishing the heating and cooling cycles described above will be explained. The lower cabinet 16 is indicated in dashed lines. Extending across the cabinet 16 near the upper, front edge as seen in FIG. 1 is the rod 34 upon which is pivotally mounted the heating block 36. It will be apparent from considering this figure that the block 36 comprises a relatively large heat conductive mass. It may be cast or otherwise formed of aluminum or any other suitable material.

In the embodiment shown, the block 36 is provided with three cylindrical openings 38, 40, and 42, each of which is adapted to receive a suitable heating element. A prototype machine utilizing three 250 watt Chromalox heating rods proved satisfactory. The block 36 is also provided with the opening 44 drilled or otherwise formed at one edge of the block, and the opening 46 formed at the opposite edge of the block. It will be seen that the openings 44 and 46 are disposed respectively between the heating elements 38 and 40, and 40 and 42. These openings 44 and 46 receive the two thermostats to be described hereinafter.

By comparing the full line showing and the dashed line showing of the block 36, it will be seen that it is pivotal from a full line position underlying the platen 18 to a position spaced therebelow.

This pivotal motion is carried out by means of the lever 48. The upper end of the lever 48 is pivotally secured to the block 36, while the lower end carries the roller 50 which rests upon the base 10. The yoke 52 which is fixedly secured to the piston 54 of the hydraulic cylinder 56 is connected by means of the pin 58 to the central portion of the lever 48. Thus, extension and retraction of the piston 54 will move the lever 48 from the full line position to the dashed line position, thereby lowering the block 36 to the dashed line position.

It will of course be understood that when the block 36 is in the uppermost position against the under surface of the platen 18, the heat will be rapidly transmitted through the platen 18 to the material clamped thereagainst.

The cooling portion of the cycle may be accomplished by means of a plurality of air jets. In FIG. 4, a horizontal pipe 60 is shown which will be provided with a plurality of openings 62. The ends of the pipe 60 will be closed in any suitable manner. The pipe 60 is supplied with air or suitable fluid at a reduced temperature via the line 64 which will be connected to a supply.

Figure 2:
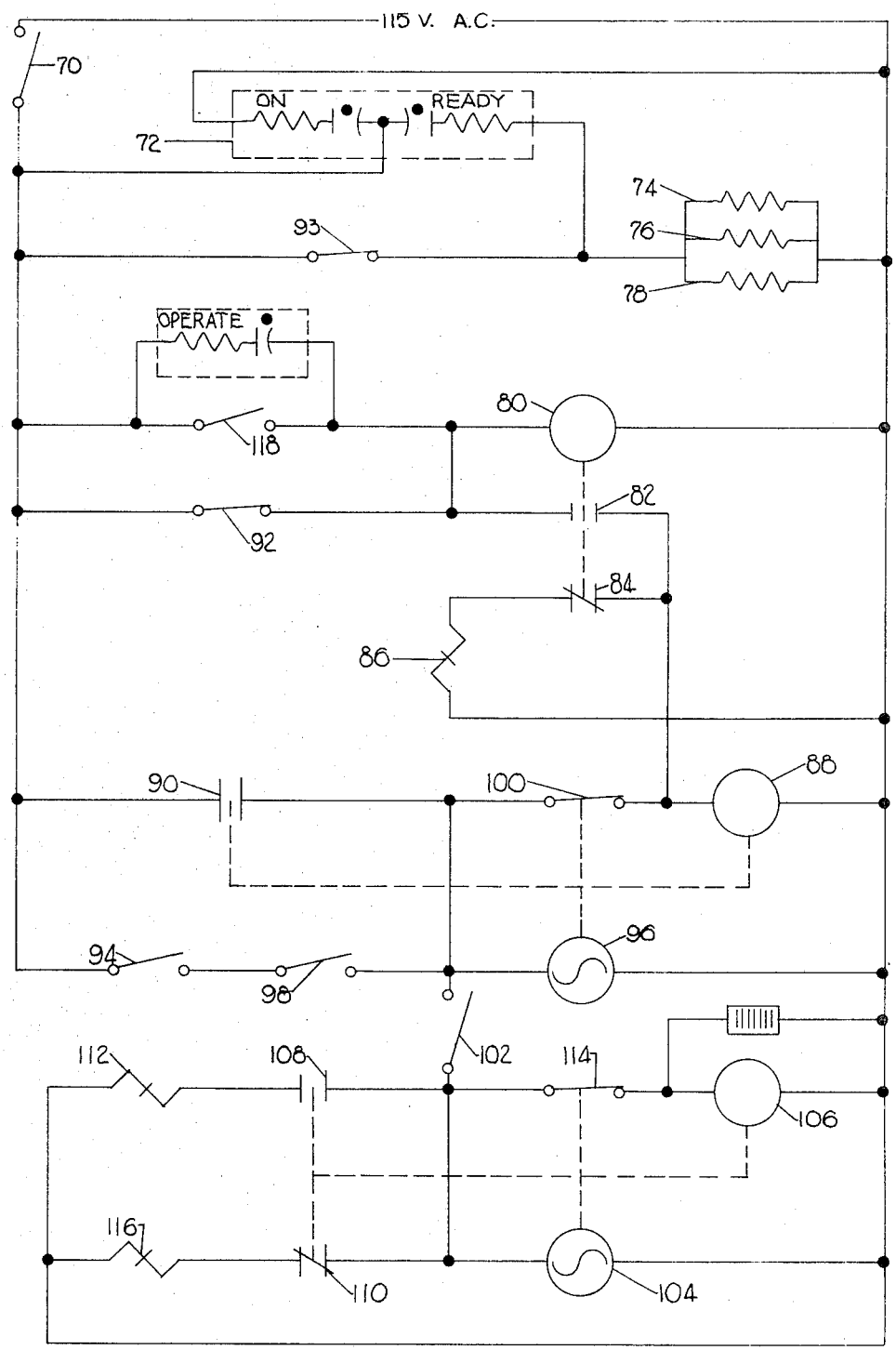
FIG. 2 is an electrical schematic diagram for the embodiment shown in FIG. 1.

Turning now to FIG. 2, one embodiment of electrical circuitry will be described. The electrical system will be connected to a suitable source of 115 volt AC single phase current. The unit is initially turned on by means of the normally open switch 70. Actuation of this switch will energize the "on" side of the dual element 72, and will energize the heating elements 74, 76 and 78. Actuation of the switch 70 will also energize the low temperature interlock relay 80, which will be effective to close the normally open contacts 82 and to open the normally closed contact 84. The opening of the contacts 84 will prevent energization of the solenoid 86 which, as will be explained hereinafter, is operative to control a pneumatic valve causing the clamping head to move up and down. Thus, opening of the contacts 84 will prevent movement of the clamping head until the heat elements have reached the required, preset temperature.

The closing of the contacts 82 will energize the control relay 88 which locks in by the closing of the normally open contacts 90.

When the minimum operating temperature which may be on the order of 425° F. is reached, the thermostat switch 92 will open, de-energizing the low temperature interlock relay 80. As already indicated, the relay 88 remains energized by virtue of the closing of the contacts 90.

Maximum operating temperature is controlled by the thermostat switch 93. When the pre-set temperature of, for example, 450° F. is reached, the switch 93 opens and the "ready" side of the dual element 72 will be energized. As the thermostat operates normally to control temperature, the "ready" light will blink.

The material to be bonded is then placed on the platen surface, and the switch 94 is closed by the operator. The switch 94 may desirably be of the petal type. Closing of the switch 94 will energize the first timing relay 96 through the contacts 98. It should be explained that the contacts 98 are part of a safety pressure switch. The contacts are normally open as shown in the drawing, but held closed so long as the air pressure in the pneumatic circuitry to be described are above a preset minimum. Thus, assuming that there is sufficient air in the pneumatic circuit, the contacts 98 will be closed, and the closing of the contacts 94 will, as indicated, energize the timing relay 96.

The closing of the contacts 94 will also energize the solenoid 86 through the safety switch contacts 98, the normally closed timer relay contacts 100, and the normally closed contacts 84. The solenoid 86 will operate the valve described later, causing the clamping head to move down to the clamping position.

As the clamping head leaves the full "up" position, it closes the switch contacts 102. The closing of these contacts is effective to start the second timer 104, and to energize relay 106, closing normally open contacts 108 and opening normally closed contacts 110. This permits energization of the solenoid 112, which as will be explained hereinafter, actuates a pneumatic valve effective to admit air to the cylinder 56 raising the heating block 36 to the uppermost position.

When the timer 104 times out, the normally closed contacts 114 are opened, thereby de-energizing the relay 106, opening the contacts 108 and closing the contacts 110. This of course will de-energize solenoid 112 to reverse the position of its associated valve and lower the heating block 36. The closing of contacts 110 will be effective to energize the solenoid 116 which will actuate another pneumatic valve to be described, and admit cooling air to the undersurface of the platen.

When timer 96 times out, it will open the normally closed contacts 100, thereby de-energizing relay 88 which will open the contacts 90 and de-energize the solenoid 86. This will reverse its associated valve, and cause the pressure head to retract. Opening of the contacts 90 will also de-energize the solenoid 116 and stop the flow of cooling air.

If, at any time during the cycle, the temperature of the heating block 36 should fall below the preset minimum, the thermostat contact 92 will be closed, thereby energizing the low temperature interlock 80, opening the contacts 84 and de-energizing solenoid 86. This causes the pressure head to retract and stay retracted for the time set on timer 96. Timer 104 and relay 106 are maintained disconnected through the normally open switch contacts 102.

Reference was made earlier to the safety switch and the rectangular ring 32. Any motion of this ring 32 will close the normally open contacts 118, thereby again energizing the relay 80, opening the contacts 84, de-energizing the solenoid 86 and causing the clamping head to retract.

Similarly, if the air pressure in the pneumatic system ever should drop below the specified minimum, the contacts 98 would be open disconnecting the manual switch 94.

In the event it is desired to reoperate the unit without waiting for the timer 96 to time out, the main switch 70 can simply be opened and closed, which will be effective to reset all relays to the initial position.

Figure 3:
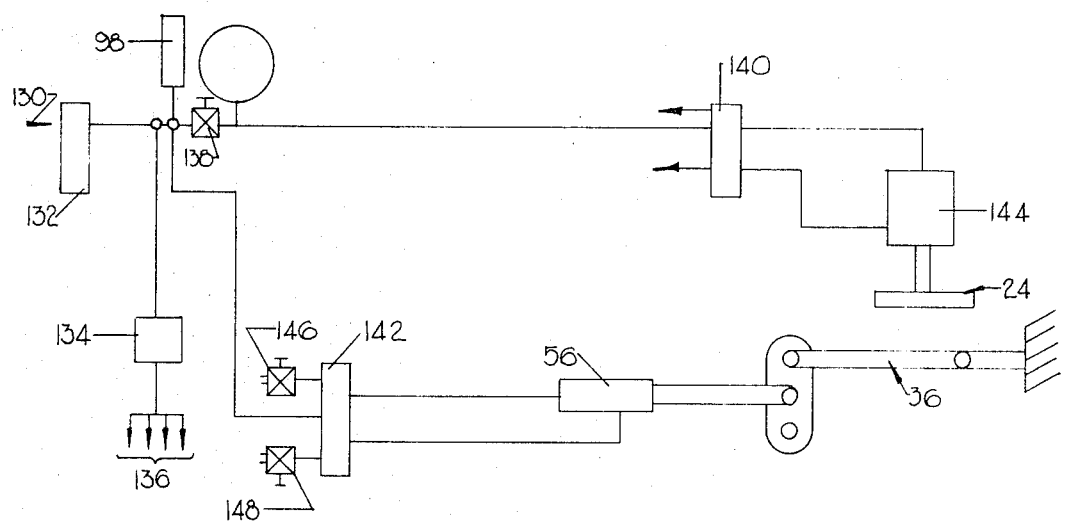
FIG. 3 is a schematic pneumatic diagram showing the operation of the pneumatic portion of the embodiment of FIG. 1.

Exemplary pneumatic circuitry is schematically shown in FIG. 3. A supply of air under pressure is connected as at 130 to an air separator 132. The air separator 132 is connected across the solenoid actuated valve 134 to the air jets schematically indicated at 136. The valve 134 is actuated in response to the solenoid 116 described earlier. The low pressure safety switch 98 is shown schematically as connected in the air inlet line. This line is connected across a pressure reducing control valve 138 with the pneumatic valve 140 and 142. The valve 140 is connected to the cylinder 144 which controls movement of the pressure head 24.

The valve 142 is connected to the cylinder 56 which controls the raising and lowering of the heating block 36. Valves 146 and 148 are needle valves controlling the escape of air to atmosphere during motion of the double acting cylinder 56.

It is believed that the foregoing constitutes a full and complete disclosure of an exemplary embodiment of this invention. Numerous modifications and design changes may be made by the worker in the art without departing from the scope and spirit of the invention. No limitations are expressed or implied except insofar as specifically set forth in the claims which follow.

The embodiments of the invention in which an exclusive property or privilege is claimed are:

1. Apparatus for bonding materials with a settable adhesive comprising:
   a platen having a horizontal surface adapted to receive the juxtaposed material to be bonded;
   pressure clamping means movable from an inoperative position spaced from said platen to a clamping position holding said materials against said platen under pressure;
   means for moving said clamping means from said inoperative position to said clamping position;
   means for supplying heat to said materials for a predetermined time interval, comprising a heat conductive mass movable from a first position spaced below said platen to a second position in contact with the under surface thereof, heating elements carried in said mass, means for energizing said heating elements, and means for moving said mass from said first position to said second position and back;
   means for cooling said materials, said cooling means being effective after said predetermined time interval; and
   means for moving said clamping means back to said inoperative position, whereby the completely bonded, cooled materials may be removed from said platen.

2. The apparatus claimed in claim 1 wherein said means for supplying heat to said materials is effective only when said pressure clamping means is in said clamping position.

3. The apparatus claimed in claim 1 wherein said heat conductive mass is pivotally mounted adjacent one edge; and wherein said means for moving said mass comprises extensible means effective to raise and lower the edge of said mass opposite said first mentioned edge.

4. The apparatus claimed in claim 3 wherein said means for cooling said materials includes at least one fluid jet positioned below said platen and directed at the underside thereof; and means for supplying fluid under pressure to said jet.

5. The apparatus claimed in claim 1 including means for sensing the temperature of said mass; and circuit means for preventing actuation of said means for moving said pressure clamping means when said temperature of said mass is below a predetermined value.

6. Apparatus for bonding materials with a heat settable adhesive comprising:
   platen means for receiving juxtaposed materials to be bonded;
   pressure clamping means movable to a clamping position holding said materials against said platen means under pressure;
   timer control means for moving said pressure clamping means to said clamping position and for maintaining said clamping position for a predetermined time interval;
   means for supplying heat to said platen only during a portion of said predetermined time interval, comprising a movable heat conductive mass, means for supplying heat to said mass, and means for moving said mass to a position substantially in contact with said platen; and
   means for cooling said platen during substantially the remainder of said time interval.

7. The apparatus claimed in claim 6 wherein said heat conductive mass is pivotally mounted adjacent one edge; and wherein said means for moving said mass comprises extensible means effective to raise and lower the edge of said mass opposite said first mentioned edge.

8. The apparatus claimed in claim 7, wherein said means for cooling said materials includes at least one fluid jet positioned below said platen and directed at the underside thereof; and means for supplying fluid under pressure to said jet.

9. Apparatus for bonding materials with a settable adhesive comprising:
   a platen having a horizontal surface adapted to receive the juxtaposed materials to be bonded;
   pressure clamping means movable from an inoperative position spaced from said platen to a clamping position holding said materials against said platen under pressure;
   means for moving said clamping means from said inoperative position to said clamping position;
   means for supplying heat to said materials for a predetermined time interval comprising a heat conductive mass selectively movable from a first position spaced below said platen to a second position in contact with the under surface thereof;
   means for cooling said materials, said cooling means being effective after said predetermined time interval; and
   means for moving said clamping means back to said inoperative position, whereby the completely bonded, cooled materials may be removed from said platen.

References Cited

UNITED STATES PATENTS

| | | | |
|---|---|---|---|
| 2,509,439 | 5/1950 | Langer | 156—366 |
| 3,397,633 | 8/1968 | Harris | 156—498 |
| 3,115,731 | 12/1963 | Blythe et al. | 156—583 |
| 3,059,690 | 10/1962 | Nyborg | 156—583 |
| 3,589,966 | 6/1971 | Gardner | 156—311 |

DOUGLAS J. DRUMMOND, Primary Examiner

U.S. Cl. X.R.

156—583